United States Patent [19]

Primack et al.

[11] 4,455,287

[45] Jun. 19, 1984

[54] METHOD OF STABILIZING CHELATED POLYVALENT METAL SOLUTIONS

[75] Inventors: Harold S. Primack, Skokie, Ill.; Dom E. Reedy, Shreveport, La.; Frederick R. Kin, Park Forest, Ill.

[73] Assignee: ARI Technologies, Inc., Palatine, Ill.

[21] Appl. No.: 358,044

[22] Filed: Mar. 15, 1982

[51] Int. Cl.³ .................. C01B 17/04; B01D 53/34
[52] U.S. Cl. .................. 423/573 R; 423/224; 423/226; 423/573 G; 423/578 R; 210/764; 422/28; 422/35; 422/36; 422/37
[58] Field of Search .............. 423/226, 573.6, 573 R, 423/578 R; 422/28, 35–37; 210/764

[56] References Cited

U.S. PATENT DOCUMENTS

| | | | |
|---|---|---|---|
| 2,944,967 | 7/1960 | Dunklin et al. | 210/764 |
| 3,097,925 | 7/1963 | Pitts, Jr. et al. | 423/226 X |
| 3,472,939 | 10/1969 | Petrocci et al. | 424/329 |
| 3,525,793 | 8/1970 | Petrocci et al. | 424/329 |
| 3,676,356 | 7/1972 | Roberts et al. | 423/226 X |
| 3,689,660 | 9/1972 | Burk et al. | 424/358 |
| 3,928,575 | 12/1975 | Moyle et al. | 424/152 |
| 4,009,251 | 2/1977 | Meuly | 423/573.6 |
| 4,163,798 | 8/1979 | Burk et al. | 424/304 |
| 4,189,462 | 2/1980 | Thompson | 423/573.6 |
| 4,206,194 | 6/1980 | Fenton et al. | 423/573 R |
| 4,393,037 | 7/1983 | Delaney et al. | 423/226 X |

OTHER PUBLICATIONS

"1981 NPRA Q & A Session on Refining and Petrochemical Technology" NPRA Sessions Held in Oct. 1981, pp. 138, 139.

*Primary Examiner*—Earl C. Thomas
*Attorney, Agent, or Firm*—Marshall, O'Toole, Gerstein, Murray & Bicknell

[57] ABSTRACT

An aqueous oxidation-reduction composition and method for removing hydrogen sulfide gas from a fluid stream by liquid phase oxidation of the hydrogen sulfide to elemental sulfur with a chelated polyvalent metal catalyst, such as iron, wherein the composition is stabilized against rapid loss of chelated polyvalent catalyst caused by contamination of the aqueous composition with micro-organisms, such as bacteria. The aqueous composition is stabilized by incorporating in the aqueous composition and adding throughout the normal usage thereof a broad spectrum biocide in an amount which acts as a bacteriostat to prevent rapid growth of bacteria in the aqueous composition and when the bacteria concentration rises above about $1 \times 10^6$ colonies per ml. slug-feeding in a kill concentration into the aqueous composition while the chelated polyvalent metal catalyst is being contacted with oxygen a fast acting broad spectrum biocide, such as 2,2-dibromo-2-cyanoacetamide or glutaraldehyde, and thereafter resuming addition of the first mentioned biocide.

7 Claims, 2 Drawing Figures

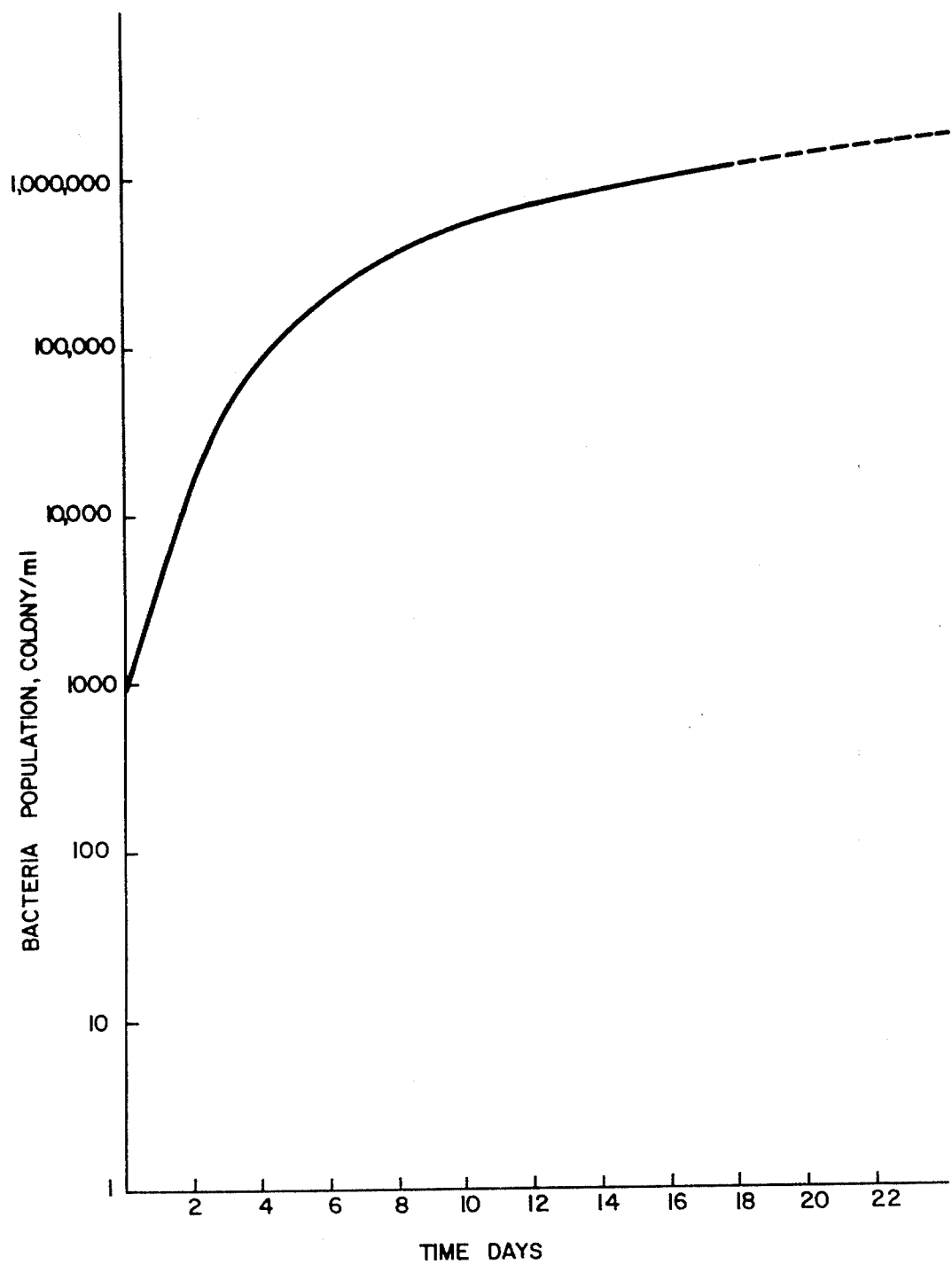

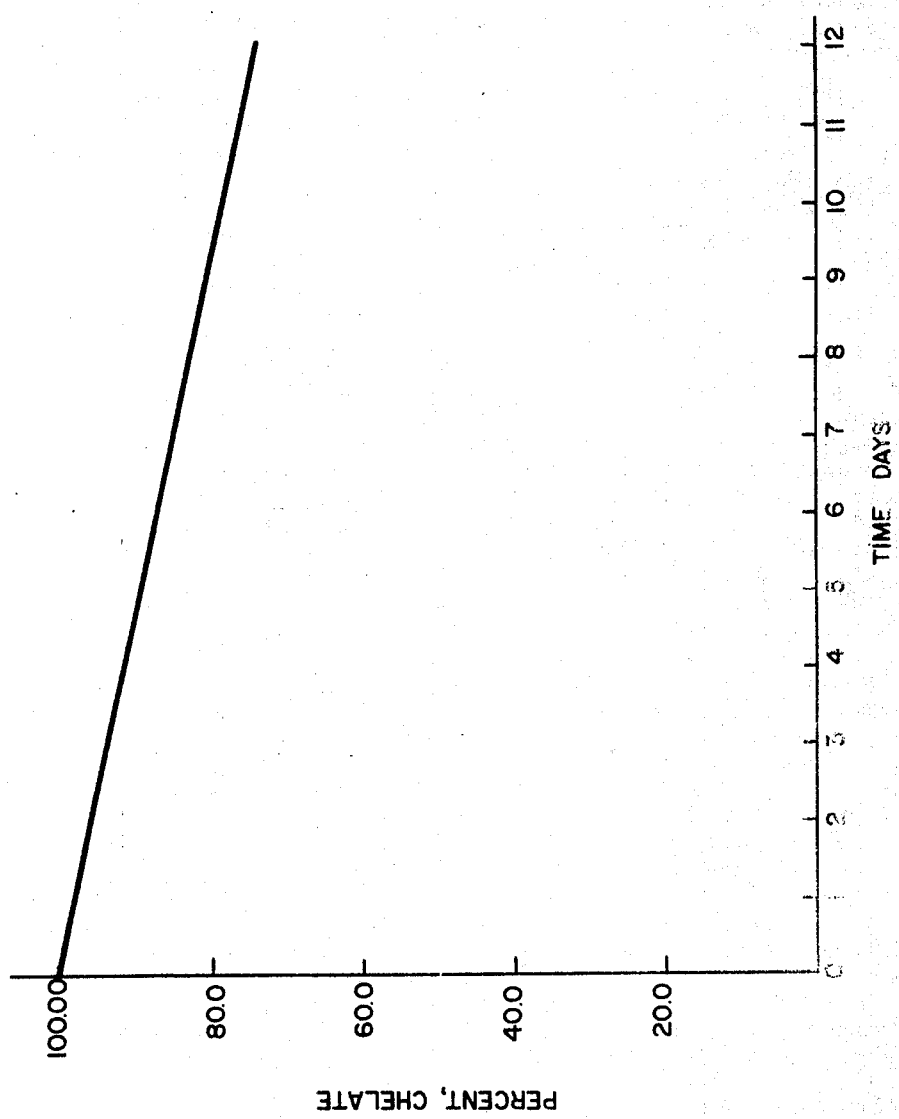

METHOD OF STABILIZING CHELATED POLYVALENT METAL SOLUTIONS

The present invention relates generally to improving a process for the continuous liquid phase oxidation of hydrogen sulfide to elemental sulfur in an aqueous reaction solution containing a chelated polyvalent metal catalyst, and more particularly to stabilizing aqueous solutions containing a chelated polyvalent metal catalyst against precipitation of the polyvalent metal catalyst from the oxidation-reduction reaction solution in which the hydrogen sulfide is continuously oxidized to elemental sulfur.

The removal of hydrogen sulfide from a fluid stream by liquid phase oxidation is old in the art (See U.S. Pat. Nos. 3,097,925, 3,676,356, 4,009,251, and 4,189,462) and in general comprises bringing a hydrogen sulfide gas-containing stream into intimate contact with an aqueous oxidizing reaction solution, preferably comprising an aqueous oxidizing solution containing polyvalent metal ions (M) as a catalyst which transfers electrons to sulfide ions in aqueous solution to form elemental sulfur while reducing the metal ions from their higher valence state to a lower valence state, as illustrated by the following equation:

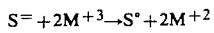

$$S^= + 2M^{+3} \rightarrow S^\circ + 2M^{+2}$$

In order to regenerate the catalytic metal ions to their original higher valence state the reduced reaction solution is contacted with oxygen dissolved in the aqueous reaction solution, as illustrated by the following equation:

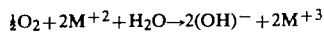

$$\tfrac{1}{2}O_2 + 2M^{+2} + H_2O \rightarrow 2(OH)^- + 2M^{+3}$$

Among the polyvalent metals which can be used in the aqueous reaction solution in ionic form are iron, copper, vanadium, manganese, platinum, tungsten, nickel, mercury, tin and lead, with iron being preferred.

In order to provide an economical workable process for removing hydrogen sulfide gas from a fluid stream in which polyvalent metal ions are used to effect continuous catalytic oxidation of hydrogen sulfide, it is desirable to provide an aqueous catalytic reaction solution which is stable at a pH ranging between slightly acidic and highly alkaline pH values, preferably from about pH 5.5 to pH 13, and which is capable of being rapidly regenerated after effecting oxidation of the hydrogen sulfide without significant loss of the catalytic metal ions and sulfur. While certain aqueous oxidizing reaction solution containing a polyvalent metal catalysts are relatively stable, other aqueous reaction solutions which contain a polyvalent metal catalyst, such as iron, must be stabilized against precipitation of metal hydroxides and metal sulfides, and it is the general practice to include in the reaction solution one or more chelating agents which maintains the metal catalyst in solution in both its higher and lower valence states and preferably over a pH range from about 5.5 to about 13.

In a continuous oxidation-reduction process for removing hydrogen sulfide by liquid phase oxidation in an aqueous solution containing an organic chelated polyvalent metal catalyst, such as ferric ion, it has been found that iron occasionally is unexpectedly and rapidly precipitated as the hydroxide or sulfide after a period of normal and efficient operation of the process for removing hydrogen sulfide gas. Careful study of these oxidation-reduction reaction solutions has shown that micro-organisms were present in large numbers in the reaction solution, presumably as a result of contamination by the make-up water or air borne micro-organisms, and that the micro-organisms were multiplying at a rapid rate. The rate of growth of bacteria in one aqueous oxidation-reduction reaction solution containing 1000 ppm iron chelated with the sodium salts of ethylenediamine tetraacetic acid (EDTA) and N-hydroxyethyl ethylenediamine triacetic acid (HEDTA) and sorbitol in accordance with the process disclosed in the Thompson U.S. Pat. No. 4,189,462 is shown in FIG. 1 of the drawing.

The graph in FIG. 2 of the drawing show the percentage loss of EDTA and HEDTA chelate compounds from the above mentioned chelated iron solution when the bacteria population in the reaction solution is about $1 \times 10^8$ colonies per ml or above. Further studies have shown that when the bacteria population in the reaction solution has a bacteria count in excess of about one million ($1 \times 10^6$) colonies per ml, the iron in the reaction solution was lost at a rate which makes it uneconomic to maintain the required amount of iron catalyst in solution by the addition of fresh chelated iron solution. And, if the bacteria and other micro-organisms are allowed to grow unabated, there is a rapid and complete loss of catalytic iron from the reaction solution which necessitates shutting down the process to clean the system and restarting the process with entirely new catalyst and chelate material.

FIG. 1 shows the rate of growth of bacteria in one aqueous oxidation-reduction reaction solution containing 1000 ppm iron chelated with the sodium salts of ethylenediamine tetraacetic acid (EDTA) and N-hydroxyethyl ethylenediamine triacetic acid (HEDTA) and sorbitol in accordance with the process disclosed in the Thompson U.S. Pat. No. 4,189,462.

FIG. 2 is a graph showing the percentage loss of the EDTA and HEDTA chelate compounds from the above mentioned chelated iron solution when the bacteria population in the reaction solution is about $1 \times 10^8$ colonies per ml or above.

It is therefore an object of the present invention to provide a method of preventing the rapid loss of chelated polyvalent metal catalyst from an aqueous oxidation-reduction solution for removing hydrogen sulfide gas from a fluid stream.

It is a further object of the present invention to provide an improved method of preventing the rapid deterioration of an aqueous chelated polyvalent metal-containing oxidation-reduction solution used for the removal of hydrogen sulfide gas from a fluid stream by continuous oxidation of the hydrogen sulfide to elemental sulfur.

It is still another object of the present invention to provide an improved method of preventing the rapid loss of chelated iron catalyst from an aqueous oxidation-reduction reaction solution for removing hydrogen sulfide gas from a petroleum processing waste gas stream.

It is also an object of the present invention to provide an improved method of preventing the precipitation of a chelated polyvalent metal catalyst from an aqueous oxidation-reduction solution in the liquid phase oxidation of hydrogen sulfide gas in a petroleum process waste gas stream to form elemental sulfur and wherein one or more of the chelating agent is a sodium salt of EDTA, a sodium salt of hydroxyethyl ethylenediamine tetra-acetic acid (HEDTA) and a sugar or reduced sugar, such as sorbitol or mannitol.

It is an additional object of the present invention to provide an improved catalytic oxidation-reduction reaction process and a stabilized chelated polyvalent metal catalytic composition for removing hydrogen sulfide from a fluid stream.

The foregoing objects are achieved and the rapid loss of chelated polyvalent metal catalyst from an aqueous oxidation-reduction solution for removing hydrogen sulfide gas from a fluid stream are substantially prevented by incorporation in the chelated polyvalent metal oxidation-reduction solution a broad spectrum biocide in an amount sufficient to act as a bacteriostat and significantly lower the rate of growth of the bacteria and other micro-organisms in the reaction solution but below a kill concentration (i.e. a concentration at which substantially all the micro-organisms are killed). While it is possible and even likely that all types of bacteria and micro-organisms do not attack the organic chelating compounds or otherwise change the composition of the reaction solution and cause rapid loss of the polyvalent metal catalyst from the reaction solution, it is expedient to employ a broad spectrum biocide which is capable of controlling most of the bacteria which are encountered in the different industrial environments, since bacteria are the micro-organisms most commonly encountered in the reaction solution.

More particularly, addition of a broad spectrum biocide, such as a quaternary ammonium chloride biocide to the oxidation-reduction reaction solution at a concentration from about 5 ppm to about 75 ppm per day enables the biocide to function effectively as a bacteriostat and prevents the rapid growth of bacteria and similar micro-organisms without interferring significantly with the catalytic oxidation of the hydrogen sulfide to elemental sulfur. And, the continuous addition of a quaternary ammonium biocide to the system during the course of the oxidation-reduction process and normal usage of the reaction solution, as by means of a metering pump, at a rate of about 10 ppm biocide per day is sufficient generally to maintain the bacteria count below a concentration of about $1 \times 10^6$ colonies per ml for an extended period and prevent the rapid loss of chelated polyvalent metal catalyst from the reaction solution.

Among the broad spectrum biocides which have been found particularly useful as a bacteriostat to control the growth of bacteria and like micro-organisms in a chelated polyvalent metal catalyst-containing oxidation-reduction solution are the quaternary ammonium chloride compounds, such as a n-higher alkylbenzyl ammonium chloride and a n-higher alkylethylbenzyl ammonium chloride and their salts. A particularly useful quaternary ammonium bacteriostat in preventing rapid growth of bacteria in a chelated polyvalent metal-containing solution for continuously oxidizing hydrogen sulfide to elemental sulfur is a proprietary mixture (See U.S. Pat. Nos. 3,472,939 and 3,525,793) of n-alkyl dimethylbenzyl ammonium chloride and n-alkyl dimethyl ethylbenzyl ammonium chloride in ethyl alcohol sold under the trademark "BTC-2125M" by Onyx Chemical Company, Jersey City, N.J.

It has been further found that when there is a massive contamination or infestation of micro-organisms or where the bacteria or other micro-organisms have been allowed to grow for a prolonged period during which tough mutants may have developed in the chelated polyvalent metal solution, the continuous low level addition of a bacteriostat, such as the quaternary ammonium compounds, is unable to control the growth of the micro-organisms in the chelated polyvalent metal-containing solution. And, when the concentration of bacteria is substantially greater than about $1 \times 10^6$ colonies per ml, additional steps are required to avoid rapid and complete loss of the chelated polyvalent metal catalyst from the oxidation-reduction reaction solution. A procedure which has been particularly effective for preventing the rapid loss of chelated polyvalent metal catalyst while prolonging the use of the oxidation-reduction reaction solution by the low-level addition of a quaternary ammonium biocide is to periodically determine the concentration of bacteria in the reaction solutions, such as by daily using the dip-slide test procedure, and when the bacteria concentration reaches about $1 \times 10^6$ colonies per ml, slug-feeding into the reaction solution a potent, fast acting, broad spectrum biocide in an amount which rapidly kills substantially all of the micro-organisms in the reaction solution without deactivating or destabilizing the chelated polyvalent metal catalyst in the reaction solution. Thereafter, the normal low-level amount of a bacteriostat is continued to be metered into the reaction solution. By following the foregoing procedure, it is possible to maintain for a prolonged period the continuous operation of a catalytic oxidation-reduction process for removing hydrogen sulfide gas from a fluid stream without rapid loss of chelated polyvalent metal catalyst.

The biocide which is particularly useful in a continuous oxidation-reduction process for oxidizing hydrogen sulfide gas to elemental sulfur using a chelated polyvalent metal catalyst, such as iron, is 2,2-dibromo-3-nitrilopropionamide (2,2-dibromo-2-cyanoacetamide). The compound is sold by the Dow Chemical Company as a proprietary composition (See U.S. Pat. Nos. 3,689,660, 3,928,575 and 4,163,798). The latter alpha-halocyanoamide compound is very potent and rapidly kills a wide range of micro-organisms which are commonly encountered in an industrial environment at a concentration of from about 10 to about 70 ppm active ingredient. When the halocyanoamide compound is added to the oxidizing zone in which the polyvalent metal catalyst is regenerated, substantially all the micro-organisms in the reaction solution are killed during the short time (10–15 min.) the reaction solution remains in the oxygenator zone. When the circulating reaction solution passes into the absorption zone in which a reducing atmosphere obtains, the halocyanoalkylamide is rapidly deactivated. It is very advantageous to have the potent biocide deactivated during normal operation of the continuous catalytic hydrogen sulfide oxidation process in order to avoid developing highly resistant mutants and to have the reaction solution free of potent biocides when any portion of reaction solution is discharged into the sewage system or like waste water treating or disposal system. Thus, the halocyanoalkylamide is particularly suited for use in an oxidation-reduction reaction solution for removing hydrogen sulfide gas from a fluid stream.

Another potent fast acting halocyano broad spectrum biocide which can be used in an aqueous oxidation-reduction reaction solution of the foregoing type is the biocide 1,2-dibromo-2,4-dicyanobutane. The latter halocyanoalkane compound is sold by Merck & Co. under the tradename "TEKTAMER 38". The latter compound approaches the activity of organic mercurial compounds in aqueous systems while having a much lower toxicity than the mercurial biocides.

Another type of potent fast acting biocide which can be used to prevent the rapid loss of chelated iron catalyst due to uncontrolled growth of bacteria and similar micro-organisms in an aqueous oxidation-reduction reaction solution for oxidizing hydrogen sulfide to elemental sulfur is glutaraldehyde. The glutaraldehyde can be used in an amount which provides from about 40 to about 100 ppm of the aldehyde in the reaction solution. A proprietary formulation of glutaraldehyde is sold by Union Carbide Company, New York, N.Y., under the tradename "UCARCIDE 250". The biocide glutaraldehyde is also sold admixed with a pluronic surfactant by the Chemco Company, Los Angeles, Calif., under the trade name "CHEMQUEST 104". The glutaraldehyde is preferably slug-fed into the oxidation-reduction system in an amount to provide about 75 ppm active ingredient in the reaction solution. While glutaraldehyde is unaffected by reducing conditions or by ammonium ions, it is neutralized by ammonia gas which is frequently prersent in the gas containing the hydrogen sulfide. And, since ammonia is present in an amount between about 5 and 10 percent in petroleum process waste gas which contains hydrogen sulfide, the glutaraldehyde must be used in an amount sufficient to react with any ammonia present in gaseous form, as when the pH of the solution drops below pH 7, in addition to providing an effective amount of the biocide to substantially kill all of the micro-organisms present in the reaction solution. When glutaraldehyde is used at a level of about 75 ppm, there is sufficient glutaraldehyde present for effectively treating a petroleum waste gas containing up to about 10 percent ammonium in addition to killing the micro-organisms in the reaction solution. The glutaraldehyde can be deactivated with ammonia gas, if desired, before the reaction solution is discharged from the system.

Although the control process of the present invention may be used to stabilize any organic chelate polyvalent metal-containing oxidation-reduction solution which is operable for removing hydrogen sulfide by liquid phase oxidation, such as N,N-dihydroxyethyleneglycine sodium salt, the process has been found to be particularly useful with a solution containing polyamino polycarboxylic types of chelating agents and when combined with polyhydroxy chelating agents selected for their ability to complex ferrous and ferric ions, respectively. As more fully described in the aforementioned Ralph B. Thompson U.S. Pat. No. 4,189,462, the first or Type A chelating agent preferably comprises (either singly or as a mixture) the polyamino polycarboxylic acids, the polyamino hydroxyethyl polycarboxylic acids, or the polyphosphonomethylamines, the latter being phosphorus analogs of the polyamino polycarboxylic acids. Usually the aforementioned types of chelating agents will be used in the form of their alkali metal salts, particularly the sodium salts. The polyamino polyacetic acids and the polyamino hydroxyethyl polyacetic acids, or their sodium salts, are particularly desirable.

The second or Type B chelating agent, preferably comprises the sugars, the reduced sugars, or the sugar acids. Examples of suitable sugars are the disaccharides, such as sucrose, lactose, and maltose, and the monosaccharides, such as glucose and fructose. Examples of suitable sugar acids are gluconic acid and glucoheptanoic acid, and these will usually be used in the form of their alkaline metal salts, particularly the sodium salts. The reduced sugars, however, are preferred for the Type B chelating agent since there is no possibility of hydrolysis or oxidation at a potential aldehyde group. Examples of suitable reduced sugars are sorbitol and mannitol.

Excellent results have been obtained using a mixture of the sodium salts of ethylene diamine tetra-acetic acid and N-hydroxyethyl ethylene diamine triacetic acid as the Type A chelating agent and using sorbitol as the Type B chelating agent. Aqueous solutions of the aforementioned Type A chelating agents are available commercially from the Dow Chemical Co. under the trademark "Versene 100" ($Na_4EDTA$) and "Versenol 120" ($Na_3HEDTA$). The use of this mixture of Type A chelating agent is particularly advantageous since it insures the desired iron complexing effect not only in the optimum pH range of from about 8 to about 10.5 but also at pH levels above and below this range.

The aforementioned chelated iron solution is prepared by dissolving a suitable iron salt in water and adding the required amounts of the Type A and Type B chelating agents. To this solution the alkaline material is then added to provide a concentrate which can be diluted with water as required to obtain the operating solution having the desired pH and iron content. The iron content of the solution may vary over a wide range, dependent upon the gas being treated and other factors. Solutions having an iron content of from about 200 ppm to about 5000 ppm by weight are preferred. In preparing the concentrate it is desirable always to add the chelating agents before the alkaline agent so as to avoid precipitation of iron. However, the presence of the two types of chelating agents improves the stability of the solution so that no great care is required in making up the solution to prevent precipitation of iron hydroxide.

For economy, the amounts of the respective chelating agents need be no greater than required to complex the amount of iron present in either valence state, and in general lesser amounts can be used. In particular, it is desirable, for ease of regeneration, that the molar ratio of Type A chelating agent to iron be not greater than 2:1 and preferably from about 1:1 to about 1.5:1. The iron salt is preferably a ferric salt such as ferric chloride, ferric sulfate, or ferric nitrate. However, it is also possible to use a ferrous salt such as ferrous sulfate, but in this case the solution must be aerated prior to use in order to insure oxidation of the chelated iron to the ferric state. The alkaline material is preferably sodium carbonate or sodium hydroxide or mixtures thereof, although other compatible alkaline compounds may be used.

The process flow for an oxidation-reduction system using a chelated iron solution and the control means of the present invention will depend upon the hydrogen sulfide content of the gas stream being treated and the nature of the other components of the gas stream. The oxidation of hydrogen sulfide and the regeneration of the chelated iron solution can be carried out in separate reaction vessels, this arrangement being referred to as anaerobic operation. However, the reaction can also be used in an aerobic operation in which the absorption and oxidation of hydrogen sulfide and the regeneration or oxidation of the chelated iron solution are carried out concurrently in the same vessel but within separate zones therein.

Gas streams containing hydrogen sulfide which may be treated in accordance with practice of this invention are produced in a wide variety of laboratories and industrial chemical processes, such as petroleum refining, wood pulping and papermaking, coal desulfurization, coal gasification, coal liquefaction, coke making, and metal refining. Hydrogen sulfide is also present in natural gas, from sewage treatment plants and in the effluent gases from many geothermal power plants.

Gas streams contaminated with hydrogen sulfide are also produced in processes such as viscose manufacture, sewage treatment, sulfuretting fatty oils, and producing organic sulfur compounds.

The following examples will serve further to illustrate the invention but are not to be construed as limiting the invention:

EXAMPLE 1

A chelated iron concentrate was prepared as described herein using a concentrated aqueous solution of Na$_4$EDTA (Versene 100) and a concentrated aqueous solution of Na$_3$HEDTA (Versenol 120) and sorbitol. The composition of the concentrate was as follows:

|  | Wt. Percent |
| --- | --- |
| Water | 55.9 |
| BCT-2125M (n-higher alkyl benzyl NH$_3$Cl and n-higher alkyl alkylbenzyl NH$_3$Cl) | 0.018 |
| FeCl$_3$ (39 wt. % aqueous solution) | 13.4 |
| Versene (38 wt. % aqueous solution Na$_4$EDTA) | 16.6 |
| Versenol 120 (41 wt. % aqueous solution Na$_3$HEDTA) | 6.3 |
| Sorbitol (70 wt. % aqueous solution) | 6.3 |
| NaOH (50 wt. % aqueous solution) | 3.6 |
| Surfactant (dodecylbenzene sulfonate) | 0.054 |
| Na$_2$CO$_3$ | 8.2 |

The concentrate was diluted 18 times its volume with water to provide a reaction solution after dilution which contains about 1000 ppm iron. The pH of the solution was preferably maintained within the range of from about pH 7.5 to about pH 9.0.

The reaction solution was used to treat a stream of off-gas from a petroleum refining process containing 3000 ppm hydrogen sulfide and about 5% ammonium by injecting the gas in a finely divided form into an absorbing chamber containing the reaction solution with the chelated iron in the ferric form. The hydrogen sulfide was rapidly oxidized to elemental sulfur which settles from solution and is periodically removed as a slurry from the bottom of the absorption chamber. During the operation the quaternary ammonium bacteriostat composition BCT-2125M, was metered continuously into the solution in the oxygenator chamber at a rate of about 10 ppm per day. Each day of the operation the concentration of bacteria in the reaction solution was determined by dipping an "Easy Cult TTC" dipslide manufactured by Orion Diagnostica of Helsinki, Finland, into the reaction solution and holding the dip slide in its container for 48 hours at a temperature of about 95° F. The bacteria count as colonies per ml was obtained by comparing the slide with calibrated standards except that at bacteria concentrations above 1×10$^6$ accurate determinations are not possible with the dip-slide.

When the bacteria concentration in the solution rose to about 1×10$^6$ colonies per ml., a quantity of the 2,2-dibromo-3-nitrilopropionamide biocide was slug-fed into the regenerative or oxygenating chamber to provide a concentration in the reaction solution of about 20 ppm active ingredient. The bacteria count rapidly decreased to a negligible concentration, and thereafter the addition of the quaternary ammonium composition was resumed at a rate of about 10 ppm per day.

EXAMPLE 2

The rapid loss of the chelated polyvalent metal catalyst in a catalytic oxidation-reduction process for removing hydrogen sulfide from a natural gas stream containing 200 ppm hydrogen sulfide was prevented by the process described herein using the concentrate of Example 1, except that the surfactant "Polytergent S-205LF", an ethoxylated linear aliphatic alcohol having between 11 and 15 carbon atom molecules and containing from 5 to 15 ethylene oxide groups manufactured by Olin Chemicals, Stamford, Conn., was substituted as the surfactant for the dodecylbenzenesulfonate. Also, glutaraldehyde was substituted for the 2,2-dibromo-2-cyanoacetamide as the fast acting biocide in an amount sufficient to provide 75 ppm active ingredient in the reaction solution.

A small quantity of a surfactant is preferably added to the concentrate so as to provide between 5 and 100 ppm surfactant in the reaction solution. The surfactants which are preferred are wetting agents which thoroughly wet the particles of elemental sulfur formed in the reaction solution so that the particles readily settle from the reaction solution and prevent air bubbles adhering to the surface of the sulfur particles or being enclosed within aggregates of sulfur particles which cause the sulfur particles to float to the surface of the reaction solution and form a layer of sulfur froth at the surface.

We claim:

1. A method of oxidizing hydrogen sulfide in gases to elemental sulfur by a continuous polyvalent metal catalytic liquid phase oxidation which prevents the rapid loss of chelated polyvalent metal catalyst from a catalytic oxidation-reduction reaction solution comprising; (1) incorporating in a chelated polyvalent metal catalyst-containing reaction solution which is exposed to contamination by bacteria and minor amounts of other micro-organisms a first broad spectrum bacteriostat for lowering the rate of growth of bacteria and other micro-organisms encountered to significantly retard the rate of growth of said bacteria and micro-organisms in said solution, (2) continuing addition of said first broad spectrum biocide to said solution at a level which is below the kill concentration and which retards the growth of said bacteria and micro-organisms in said solution and maintains the concentration of said microorganisms below about 1×10$^6$ colonies per ml for an extended period, (3) periodically determining the concentration of said bacteria in said solution and in the event the concentration of said microorganisms increase above about 1×10$^6$ colonies per ml slug-feeding into said solution a potent fast acting second broad spectrum biocide having bactericidal action in an amount which rapidly kills substantially all said bacteria and other micro-organisms in said solution, and (4) thereafter resuming addition of said bacteriostat to said reaction solution.

2. A method as in claim 1, wherein said polyvalent metal is chelated with an organic chelating agent selected from the group consisting of EDTA, HEDTA, soluble salts of EDTA and HEDTA, sorbitol and mannitol.

3. A method as in claim 2, wherein said bacteriostat which is incorporated in said solution before contacting with hydrogen sulfide is selected from the group of quaternary ammonium compounds consisting of alkyl benzyl ammonium chloride, alkyl ethyl benzyl ammonium chloride, and the salts thereof.

4. A method as in claim 3, wherein said bacteriostat is continuously added to said solution at a rate of about 10 ppm per day.

5. A method as in claim 1, wherein said fast acting biocide is selected from the group consisting of halocyano-lower alkyl-amides and halocyano-loweralkanes.

6. A method as in claim 5, wherein said fast acting biocide is 2,2-dibromo-2-cyanoacetamide and said biocide is added to said solution while said catalyst is being oxidized to its higher valence state.

7. A method as in claim 1, wherein said biocide is glutaraldehyde.

* * * * *

UNITED STATES PATENT AND TRADEMARK OFFICE
CERTIFICATE OF CORRECTION

PATENT NO. : 4,455,287

DATED : June 19, 1984

INVENTOR(S) : Harold S. Primack, Dom E. Reedy, Frederick R. Kin

It is certified that error appears in the above-identified patent and that said Letters Patent is hereby corrected as shown below:

Column 8, line 46, cancel "biocide" and substitute

--bacteriostat--.

Signed and Sealed this

Thirteenth Day of November 1984

[SEAL]

Attest:

Attesting Officer

GERALD J. MOSSINGHOFF

Commissioner of Patents and Trademarks